United States Patent Office 2,857,336
Patented Oct. 21, 1958

2,857,336

SUPPORTED NOBLE METAL CATALYST

Hubert A. Shabaker, Media, Pa., assignor to Houdry Process Corporation, Wilmington, Del., a corporation of Delaware No Drawing. Application May 15, 1952
Serial No. 288,042

2 Claims. (Cl. 252—466)

The present invention relates to supported noble metal catalysts of the platinum family type and is particularly concerned with improved methods of incorporating the active metal component in a porous support or carrier so as to assure more uniform distribution of the metal therein. In its more specific embodiments the invention is especially directed to the preparation of catalysts comprising very small amounts of platinum, as between about 0.1 to 1% or 2% by weight, in an aluminaceous carrier consisting essentially of activated alumina or of other forms of gamma alumina.

Catalysts comprising a small amount of platinum or other metal of the platinum family on various types of carriers have been known to the art for some time. Among the carriers proposed or used there are included charcoal, clay, silica-alumina gel, alumina and halide treated alumina. In such catalysts containing small amounts of the noble metal, as up to about 2% by weight thereof, the manner of incorporating said metal becomes highly important from the standpoint of the accessible catalyst surface provided thereby, which largely determines the initial activity and comparative stability of the catalyst.

These catalysts are used in selective dehydrogenation and dehydroisomerization of naphthenes in the production of aromatics and for the upgrading of gasoline and naphthas in general. Catalysts which have been found to give the desired selectivity in hydrocarbon conversion processes of the type above named have been prepared (as set forth in Oblad et al. 2,723,947) by treatment of calcinated gamma alumina or activated alumina of commerce, with acetic or other dilute acid, removing the acid by washing and heat treatment, and thereafter incorporating platinum by impregnation of the heat-treated alumina with chloroplatinic acid or other decomposable solution combinations of the noble metal. By the present invention further improvement over Oblad et al. 2,723,947 are provided in such catalysts from the standpoint of more uniform distribution of the platinum.

In accordance with the present invention calcined alumina, preferably in the form of molded or otherwise formed pellets, in "active" porous form such as the usual gamma alumina, is treated with dilute acetic acid; which serves among other purposes to release any detrimental residual alkali metal present in the alumina. The acid treated alumina is then washed with alkali-free water to an extent sufficient to remove substantially all of the alkali thus freed, but the water-washing is not continued to such extent as to remove the acetic acid, so that at the conclusion of the washing operation there is still retained in the alumina a certain amount of acid such that the alumina after drying is slightly but definitely on the acid side; that is, the dried alumina ground into a slurry with neutral water will show a pH of less than 6.0 and preferably about 3.5 to 5.0. The alumina in this condition and containing acid is then dried at a temperature which will fix the acid therein but short of that causing decomposition or volatilization of the major part of the acid; heating for up to no more than about 1 hour at below 300° F. is effective for this purpose thus differing from the 900° F. heating recommended in Oblad et al. 2,723,947. The dried acid-containing alumina is now dipped in aqueous chloroplatinic acid or other water soluble platinum complex in aqueous solution for a sufficient period to enable the platinum to spread through the pellets, and is then dried and subsequently calcined. The pellets so prepared have the platinum fixed in well distributed condition throughout the interior of the pellet.

Without being bound to any particular theory of operation, it appears that by providing the alumina in acidic condition, the platinum is enabled to penetrate the pellet and becomes fixed therein on subsequent drying and calcining without substantial migration of the platinum during drying and/or calcining. In the absence of acid the platinum reacts with or is sorbed on the surface of the alumina and has little tendency to penetrate to the interior. It was found, for instance, that in contacting untreated alumina with chloroplatinic acid, almost immediate deposition of platinum or some combination of platinum is brought about in that the excess solution soon rises in pH. Examination of the subsequently dried pellets indicates that the platinum is held through a shallow surface layer of the pellet. On the other hand when the alumina pellets are pretreated with acid and the dried pellets containing residual acid are dipped in the platinum-containing solution the platinum penetrates well into the interior of the pellets.

Use of excess acid with the chloroplatinic impregnating solution does not necessarily accomplish the same desired effect. While good penetration of the solution into the pellets is sometimes obtained under these conditions, the platinum, on the other hand, can remain in the solution taken up in the pores of the pellet and then would not be deposited in the pellet until the drying step; the excess solution outside of the pellet would therefore contain platinum which is not taken up by the pellet.

In the process according to the invention chemisorption or combination of the platinum in the acidic pellet takes place readily. From the following example, the improved distribution of platinum will be appreciated.

*Example 1*

(a) Commercial "activated alumina" pellets (Harshaw) of 4 mm. size were treated with 10% acetic acid for one hour, decanted, and treated a second time for another hour with fresh acid of the same concentration, each treatment employing an amount of acid just sufficient to cover the pellets. The acid-treated pellets were washed five times with water and dried for ½ hour at 270° F. The dried pellets thus prepared contained 2.07% volatiles ($H_2O$) removable at 1000° F., and the pH of a ground slurry of the pellets in water was 4.1.

(b) For comparison with the above, another sample of "activated alumina" pellets was similarly treated with acetic acid, then water washed twenty times, dried and calcined at 900° F. for one hour in flowing air. The pH of a ground slurry of the pellets in water was 7.0–7.5.

(c) Each of the above samples was impregnated by dipping in chloroplatinic acid solution in water using an amount giving 0.5 gram Pt in 55 milliliters of aqueous solution per 100 grams of pellets. This volume of solution was in excess (by about 10%) of that required to saturate the pellets. The pellets were permitted to remain in the solution over a period up to one hour, then dried at 240° F. over a 2 hour period, followed by calcination for one hour at 1400° F. The results are tabulated below:

| | Pt impregnated Sample a | | | Pt impregnated Sample b | | |
|---|---|---|---|---|---|---|
| pH ground Al$_2$O$_3$ in water | 4.1 | | | 7.2-7.4 | | |
| After impregnation with Pt for | Minutes | | | Minutes | | |
| | 5 | 10 | 30 | 60 [1] | 30 | 60 |
| Penetration, yellow color (mm.) | 0.5-1 | 0.5-1 | 1-1.5 | [1] 1-1.5 | 0.5-1 | 0.5-1 |
| Color of Excess solution | colorless | | | colorless | | |
| pH of excess solution | 3-4 | 5 | 5-6 | 5-6 | 5-6 | 5-6 |
| After drying, Depth of yellow color (mm.) | uniform and complete | | | ½ to 1 | | |
| Color after calcination | light tan grey | | | bluish black with white center | | |

[1] Thorough washing with water showed no change in pellet color and test of wash water showed pH 5-6 and no content of platinum.

The catalyst of the invention may be used generally wherever supported platinum type catalyst is called for and finds particular advantage in processes involving hydrogenation or dehydrogenation of hydrocarbons as for instance in upgrading of gasoline and naphthas and in the production of aromatic hydrocarbons. The operating conditions of use are those otherwise known or described for these operations in connection with previous platinum catalysts. Thus, hydrogenative reforming may be carried out at temperatures of about 750-1050° F. and preferably in the range of 850-1000° F. and at pressures of 200-1000 pounds per square inch, 3-10 mols of fresh or recycled hydrogen being added per mol of hydrocarbon charged. Under these conditions there will be, in addition to dehydrogenation of the cyclohexane ring naphthenes, a substantial dehydroisomerization of alkyl cyclopentanes to form aromatics.

A typical operation for aromatics production from a naphthenic distillate is set out below:

*Example II*

The catalyst consisting of 0.5% Pt on alumina is prepared by dipping alumina pellets containing acetic acid residue (as a result of treatment described in Example Ia above). This catalyst is charged to three separate fixed bed reaction vessels connected in series.

The hydrocarbon feed is a virgin motor naphtha boiling approximately in the range of 230-410° F. having an API gravity of about 52.8° and an F$_1$ clear octane rating below 38. The three reactors are operated at temperatures of 975° F. at a pressure ranging from a maximum of 900 pounds per square inch in the first reactor to 700 pounds in the high pressure flash drum receiving the effluent from the third reactor. The high pressure gas (which runs over 95% H$_2$ content) from the flash drum is recycled at the rate of 10 mols per mol of hydrocarbon feed, and the fresh hydrocarbon feed is supplied at a space rate of 1.5 volumes (as liquid) per hour per volume of catalyst in the reactors.

Under these operating conditions there is obtained a liquid recovery (C$_5$+ motor gasoline) of over 80% by volume of naphtha charged and having an F$_1$ clear octane in the order of 95.

Obviously many modifications and variations of the invention as hereinbefore set forth may be made without departing from the spirit and scope thereof and therefore only such limitations should be imposed as are indicated in the appended claims.

What is claimed is:

1. In the method of preparing a hydrocarbon conversion catalyst in which calcined, activated gamma alumina particles are successively treated with acetic acid, washed, heated, impregnated with a platinum compound, and dried, the improvement which includes the steps of: washing the acetic-acid-treated particles with a limited amount of water, whereby a significant amount of acetic-acid remains adsorbed upon the particles, drying the thus acetic-acid impregnated alumina particles at a temperature less than 300° F. to prepare acetic-acid containing alumina particles; and impregnating a platinum compound into the thus obtained acetic-acid containing alumina particles, whereby the platinum is distributed throughout the thickness of the alumina particles in such a manner as to resist migration to the surfaces of the alumina particles.

2. The method of preparing a supported platinum catalyst which comprises immersing calcined, activated gamma alumina particles in dilute acetic acid for more than about an hour, water washing the acetic-acid-treated material without completely removing the acetic acid, drying the acetic-acid-containing particles at a temperature or de- 300° F. without causing complete volatilization or decomposition of the residual acetic acid therein and thereafter treating the particles containing residual acetic acid with an aqueous solution of a soluble platinum compound, to distribute the platinum throughout the thickness of the particles, and drying the platinum impregnated particles.

References Cited in the file of this patent

UNITED STATES PATENTS

| | | |
|---|---|---|
| 1,502,260 | Lucas | July 22, 1924 |
| 2,006,221 | Ridler | June 25, 1935 |
| 2,006,222 | Ridler | June 25, 1935 |
| 2,322,622 | Fischer et al. | June 22, 1943 |
| 2,348,624 | Hillman | May 9, 1944 |
| 2,406,646 | Webb et al. | Aug. 27, 1946 |
| 2,479,109 | Haensel | Aug. 16, 1949 |
| 2,566,521 | Haensel | Sept. 4, 1951 |
| 2,602,772 | Haensel | July 8, 1952 |
| 2,606,878 | Haensel | Aug. 12, 1952 |
| 2,636,909 | Oblad et al. | Apr. 28, 1953 |
| 2,723,947 | Oblad et al. | Nov. 15, 1955 |

UNITED STATES PATENT OFFICE
CERTIFICATE OF CORRECTION

Patent No. 2,857,336                                                   October 21, 1958

Hubert A. Shabaker

It is hereby certified that error appears in the printed specification of the above numbered patent requiring correction and that the said Letters Patent should read as corrected below.

Column 1, line 46, for "calcinated" read -- calcined --; line 52, for "improvement" read -- improvements --; column 4, line 36, for "or de-" read -- below --.

Signed and sealed this 27th day of January 1959.

(SEAL)
Attest:

KARL H. AXLINE                                             ROBERT C. WATSON
Attesting Officer                                         Commissioner of Patents